(12) United States Patent
He et al.

(10) Patent No.: US 12,424,008 B2
(45) Date of Patent: Sep. 23, 2025

(54) OBJECT RECOGNITION PROCESSING METHOD, PROCESSING APPARATUS, ELECTRONIC DEVICE, AND STORAGE MEDIUM

(71) Applicant: Hangzhou Dana Technology Inc., Zhejiang (CN)

(72) Inventors: Tao He, Zhejiang (CN); Fan Shi, Zhejiang (CN); Huan Luo, Zhejiang (CN); Mingquan Chen, Zhejiang (CN)

(73) Assignee: Hangzhou Dana Technology Inc., Zhejiang (CN)

( * ) Notice: Subject to any disclaimer, the term of this patent is extended or adjusted under 35 U.S.C. 154(b) by 365 days.

(21) Appl. No.: 18/022,523

(22) PCT Filed: Jul. 27, 2021

(86) PCT No.: PCT/CN2021/108775
§ 371 (c)(1),
(2) Date: Feb. 22, 2023

(87) PCT Pub. No.: WO2022/042181
PCT Pub. Date: Mar. 3, 2022

(65) Prior Publication Data
US 2023/0267755 A1  Aug. 24, 2023

(30) Foreign Application Priority Data
Aug. 25, 2020 (CN) .......................... 202010864625.8

(51) Int. Cl.
*G06V 30/00* (2022.01)
*G06V 10/82* (2022.01)
*G06V 30/16* (2022.01)

(52) U.S. Cl.
CPC .............. *G06V 30/16* (2022.01); *G06V 10/82* (2022.01)

(58) Field of Classification Search
CPC ........ G06V 30/16; G06V 10/82; G06V 20/00; G06N 5/046; G06N 3/045; G06N 3/0464;
(Continued)

(56) References Cited

U.S. PATENT DOCUMENTS

2021/0174016 A1* 6/2021 Fox ........................ G06N 3/045

FOREIGN PATENT DOCUMENTS

| CN | 104376315 | 2/2015 |
|----|-----------|--------|
| CN | 108764074 | 11/2018 |

(Continued)

OTHER PUBLICATIONS

Saxton et al, Analysing Mathematical Reasoning Abilities of Neural Models, arXiv:1904.01557v1 (Year: 2019).*

(Continued)

*Primary Examiner* — Xiao Liu
(74) *Attorney, Agent, or Firm* — JCIPRNET

(57) ABSTRACT

An object recognition processing method, a processing apparatus, an electronic device, and a non-transitory computer-readable storage medium. The method includes: obtaining an object to be recognized; recognizing a type of the object on the basis of a type recognition model; determining a processing rule corresponding to the object; in response to the fact that the type of the object is a basic type, taking the object as a target object to be recognized, and in response to the fact that the type of the object is a non-basic type, transforming the object by means of a transformer learning model, so as to transform the object into the target object to be recognized; and performing, by means of the transformer learning model, recognition processing on the target object to be recognized to obtain a target result corresponding to the target object to be recognized.

13 Claims, 3 Drawing Sheets

(58) Field of Classification Search
CPC ........ G06N 3/0895; G06N 3/08; G06F 40/16;
G06F 18/24; G06F 40/279
See application file for complete search history.

(56) References Cited

FOREIGN PATENT DOCUMENTS

| | | | | |
|---|---|---|---|---|
| CN | 108932508 A | * | 12/2018 | ......... G06K 9/00442 |
| CN | 109947836 | | 6/2019 | |
| CN | 111369290 A | * | 7/2020 | ........... G06F 16/258 |
| CN | 112001152 | | 11/2020 | |
| KR | 20170103239 | | 9/2017 | |

OTHER PUBLICATIONS

Vaswani et al, Attention Is All You Need, Advances in Neural Information Processing Systems (NIPS), (Year: 2017).*
Luo et al, A BERT-based Approach with Relation-aware Attention for Knowledge Base Question Answering, 2020 International Joint Conference on Neural Networks (IJCNN) (Year: 2020).*
"International Search Report (Form PCT/ISA/210) of PCT/CN2021/108775," mailed on Oct. 26, 2021, with English translation thereof, pp. 1-4.
"Written Opinion of the International Searching Authority (Form PCT/ISA/237) of PCT/CN2021/108775," mailed on Oct. 26, 2021, pp. 1-5.

* cited by examiner

OBJECT RECOGNITION PROCESSING METHOD, PROCESSING APPARATUS, ELECTRONIC DEVICE, AND STORAGE MEDIUM

CROSS-REFERENCE TO RELATED APPLICATION

This application is a 371 of international application of PCT application serial no. PCT/CN2021/108775, filed on Jul. 27, 2021, which claims the priority benefits of China Patent application Ser. No. 202010864625.8, filed on Aug. 25, 2020. The entirety of each of the above-mentioned patent applications is hereby incorporated by reference herein and made a part of this specification.

BACKGROUND

Technical Field

Embodiments of the present disclosure relate to an object recognition processing method, a processing apparatus, an electronic device, and a non-transitory computer-readable storage medium.

Description of Related Art

A transformer learning model (transformer model) is composed of an encoder and a decoder, capable of transforming one text to another, and therefore is commonly used in the field of natural language processing (NLP), such as machine translation, question-answering system, text and speech recognition etc.

SUMMARY

At least one embodiment of the present disclosure provides an object recognition processing method, which includes: obtaining an object to be recognized; recognizing a type of the object to be recognized on the basis of a type recognition model; determining, according to the type of the object to be recognized, a processing rule corresponding to the object to be recognized; performing, according to the processing rule, recognition processing on the object to be recognized through a transformer learning model to obtain a target result corresponding to the object to be recognized, and the step of performing, according to the processing rule, recognition processing on the object to be recognized by means of the transformer learning model to obtain a target result corresponding to the object to be recognized includes: in response to that the type of the object to be recognized is a basic type, taking, according to the processing rule, the object to be recognized as a target object to be recognized, and in response to that the type of the object to be recognized is a non-basic type, transforming the object to be recognized by means of the transformer learning model according to the processing rule, so as to transform the object to be recognized into the target object to be recognized; and performing recognition processing on the target object to be recognized by means of the transformer learning model, so as to obtain a target result corresponding to the object to be recognized, and the type of the target object to be recognized is a basic type.

For example, in the object recognition processing method provided in an embodiment of the present disclosure, the step of performing recognition processing on the target object to be recognized by means of the transformer learning model, so as to obtain the target result corresponding to the object to be recognized includes: performing recognition processing on the target object to be recognized by means of the transformer learning model, so as to obtain a processing result corresponding to the target object to be recognized; processing the processing result according to the processing rule, so as to obtain the target result corresponding to the object to be recognized.

For example, in the object recognition processing method provided in an embodiment of the present disclosure, the basic types include calculation-based questions or knowledge-based question, and the non-basic types include calculation-based fill-in-the-blank questions, calculation-based true-false questions, calculation-based multiple-choice questions, knowledge-based fill-in-the-blank questions, knowledge-based true-false questions, or knowledge-based multiple-choice questions.

For example, in the object recognition processing method provided in an embodiment of the present disclosure, the step of transforming the object to be recognized by means of the transformer learning model, so as to transform the object to be recognized into the target object to be recognized includes: in response to that the type of the object to be recognized is the calculation-based fill-in-the-blank questions or knowledge-based fill-in-the-blank questions, transforming the object to be recognized into the target object to be recognized directly by means of the transformer learning model; in response to that the type of the object to be recognized is the calculation-based true-false questions, deleting the judgment result from the object to be recognized by means of the transformer learning model, so as to transform the object to be recognized into a first intermediate object to be recognized, and transforming the first intermediate object to be recognized into the target object to be recognized, and the type of the first intermediate object to be recognized is the calculation-based fill-in-the-blank questions; in response to that the type of the object to be recognized is the calculation-based multiple-choice questions or the knowledge-based multiple-choice questions, deleting respective options from the object to be recognized by means of the transformer learning model, and transforming the question stem in the object to be recognized into the target object to be recognized; in response to that the type of the object to be recognized is the knowledge-based true-false questions, transforming the object to be recognized into a third intermediate object to be recognized by means of the transformer learning model, and the type of the third intermediate object to be recognized is the knowledge-based multiple choice questions; deleting respective options from the third intermediate object to be recognized, transforming the question stem in the third intermediate object to be recognized into a second intermediate object to be recognized, and transforming the second intermediate object to be recognized into the target object to be recognized, and the type of the second intermediate object to be recognized is the knowledge-based fill-in-the-blank questions.

For example, in the object recognition processing method provided in an embodiment of the present disclosure, the step of determining, according to the type of the object to be recognized, a processing rule corresponding to the object to be recognized includes: in response to that the type of the object to be recognized is the calculation-based fill-in-the-blank questions or the knowledge-based fill-in-the-blank questions, the processing rule corresponding to the object to be recognized includes adding a keyword for the target object to be recognized; in response to that the type of the object to be recognized is the calculation-based multiple-choice questions or the knowledge-based multiple-choice questions, the processing rule corresponding to the object to be recognized includes selecting the option that is the same as the processing result from the respective options in the object to be recognized; in response to that the type of the object to be recognized is the calculation-based true-false questions, the processing rule corresponding to the object to be recognized includes comparing the processing result with the judgment result in the object to be recognized; in response to that the type of the object to be recognized is the knowledge-based true-false questions, the processing rule corresponding to the object to be recognized includes selecting the option that is the same as the processing result from the respective options in the third intermediate object to be recognized.

For example, in the object recognition processing method provided in an embodiment of the present disclosure, the step of processing the processing result according to the processing rule, so as to obtain the target result corresponding to the object to be recognized includes: in response to that the type of the object to be recognized is the calculation-based questions or the knowledge-based questions, outputting the processing result directly as the target result; in response to that the type of the object to be recognized is the calculation-based fill-in-the-blank questions or the knowledge-based fill-in-the-blank questions, taking the part corresponding to the keyword in the processing result as the target result; in response to that the type of the object to be recognized is the calculation-based multiple-choice questions or the knowledge-based multiple-choice questions, selecting the option that is the same as the processing result from the respective options in the object to be recognized and taking the sequence number of the option that is the same as the processing result as the target result; in response to that the type of the object to be recognized is the calculation-based true-false questions, comparing the processing result with the judgment result in the object to be recognized to obtain a comparison result, and taking the comparison result as the target result, and the comparison result includes true, false or to be determined; in response to that the type of the object to be recognized is the knowledge-based true-false questions, selecting the option that is the same as the processing result from the respective options in the third intermediate object to be recognized, and taking the option that is the same as the processing result as the target result.

For example, in the object recognition processing method provided in an embodiment of the present disclosure, when the type of the object to be recognized is the calculation-based fill-in-the-blank questions, the keyword is "fill-in-the-blanks". When the type of the object to be recognized is the knowledge-based fill-in-the-blank questions, the keyword is "fill in text".

For example, in the object recognition processing method provided in an embodiment of the present disclosure, the step of obtaining the object to be recognized includes: obtaining an input image, and the input image includes the object to be recognized; processing the input image by means of a region recognition model, so as to obtain a region to be recognized including the object to be recognized; processing the region to be recognized through a character recognition model, so as to obtain the object to be recognized.

For example, in the object recognition processing method provided in an embodiment of the present disclosure, the input image is an image of a paper quiz, and the object to be recognized is a test question on the paper quiz.

For example, in the object recognition processing method provided in an embodiment of the present disclosure, the transformer learning model is a model based on a neural network.

At least one embodiment of the present disclosure provides a processing apparatus, which includes: an acquisition module, configured to acquire an object to be recognized; a type recognition module, configured to recognize the type of the object to be recognized based on a type recognition model; a rule determining module, configured to determine the processing rule corresponding to the object to be recognized according to the type of the object to be recognized; a transformer module, configured to recognize the object to be recognized by means of the transformer learning model according to the processing rule, so as to obtain the target result corresponding to the object to be recognized. When the transformer module executes the operation of recognizing the object to be recognized by means of the transformer learning model according to the processing rule to obtain the target result corresponding to the object to be recognized, the operation includes the following steps: in response to that the type of the object to be recognized is the basic type, taking the object to be recognized as the target object to be recognized according to the processing rule, in response to that the type of the object to be recognized is a non-basic type, transforming the object to be recognized by means of the transformer learning model according to the processing rule, so as to transform the object to be recognized into a target object to be recognized; recognizing the target object to be recognized by means of the transformer learning model, so as to obtain a target result corresponding to the object to be recognized, and the type of the target object to be recognized is the basic type.

At least one embodiment of the present disclosure provides an electronic device, which includes: a memory configured to store computer-readable instructions in a non-transitory manner; a processor configured to execute the computer-readable instructions. When the computer-readable instructions are executed by the processor, the object recognition processing method described in any one of the foregoing embodiments is implemented.

At least one embodiment of the present disclosure provides a non-transitory computer-readable storage medium, and the non-transitory computer-readable storage medium stores computer-readable instructions. When the computer-readable instructions are executed by the processor, the object recognition processing method described in any one of the foregoing embodiments is implemented.

BRIEF DESCRIPTION OF THE DRAWINGS

In order to illustrate the technical solutions of the embodiments of the present disclosure more clearly, the accompanying drawings of the embodiments will be briefly introduced below. Clearly, the accompanying drawings in the following description only relate to some embodiments of the present disclosure, rather than limiting the present disclosure.

DESCRIPTION OF THE EMBODIMENTS

Figure 1:
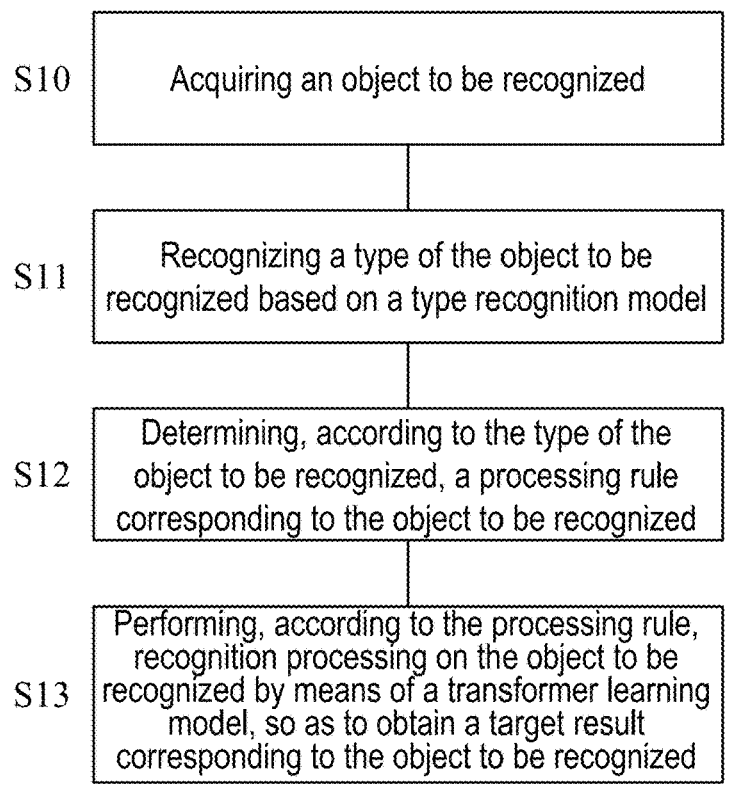
FIG. 1 is a schematic flowchart of an object recognition processing method provided in at least one embodiment of the present disclosure.

In order to make the purpose, technical solutions and advantages of the embodiments of the present disclosure clearer, the technical solutions of the embodiments of the present disclosure will be clearly and completely described below in conjunction with the drawings of the embodiments of the present disclosure. Clearly, the described embodiments are some of the embodiments of the present disclosure, not all of them. Based on the described embodiments of the present disclosure, all other embodiments obtained by persons of ordinary skill in the art without creative effort fall within the protection scope of the present disclosure.

Unless otherwise defined, the technical terms or scientific terms used in the present disclosure shall have the common meanings understood by those skilled in the art to which the present disclosure belongs. "First", "second" and similar words used in the present disclosure do not indicate any order, quantity or importance, but are only used to distinguish different components. "Comprising" or "including" and similar words mean that the elements or items appearing before the word include the elements or items listed after the word and their equivalents, without excluding other elements or items. Words such as "connected" or "linked" are not limited to physical or mechanical connections, but may include electrical connections, whether direct or indirect connection. "Upper", "Lower", "Left", "Right" and so on are only used to indicate the relative positional relationship. When the absolute position of the described object changes, the relative positional relationship may also change accordingly.

In order to keep the following description of the embodiments of the present disclosure clear and concise, the present disclosure omits detailed descriptions of some known functions and known components.

At least one embodiment of the present disclosure provides an object recognition processing method, a processing apparatus, an electronic device, and a non-transitory computer-readable storage medium. The object recognition processing method includes: obtaining an object to be recognized; recognizing a type of the object to be recognized on the basis of a type recognition model; determining, according to the type of the object to be recognized, a processing rule corresponding to the object to be recognized; performing, according to the processing rule, recognition processing on the object to be recognized through a transformer learning model to obtain a target result corresponding to the object to be recognized.

For example, the step of performing, according to the processing rule, recognition processing on the object to be recognized by means of the transformer learning model to obtain a target result corresponding to the object to be recognized includes: in response to that the type of the object to be recognized is a basic type, taking, according to the processing rule, the object to be recognized as a target object to be recognized, and in response to that the type of the object to be recognized is a non-basic type, transforming the object to be recognized by means of the transformer learning model according to the processing rule, so as to transform the object to be recognized into the target object to be recognized; and performing recognition processing on the target object to be recognized by means of the transformer learning model, so as to obtain a target result corresponding to the object to be recognized, and the type of the target object to be recognized is a basic type.

The object recognition processing method adopts different processing rules to recognize different types of object to be recognized (for example, text questions, etc.) to obtain the target result corresponding to the object to be recognized. Moreover, the object recognition processing method may reduce the amount of calculation while improving parallel efficiency without causing damage to the final recognition result, and the recognition accuracy is high.

For example, the object recognition processing method may automatically correct the text questions in the paper quiz, automatically obtain the answers to the text questions in the sample paper quiz, etc. In this way, the technical solution provided in the present disclosure is able to solve the difficulties in recognizing text questions in the related art and improve the efficiency of correcting paper quiz.

It should be noted that the object recognition processing method provided in the embodiment of the present disclosure may be applied to the processing apparatus provided in the embodiment of the present disclosure, and the processing apparatus may be configured on an electronic device. The electronic device may be a personal computer, a mobile terminal, etc., and the mobile terminal may be a hardware device with various operating systems, such as a mobile phone and a tablet computer.

Embodiments of the present disclosure will be described in detail below with reference to the accompanying drawings, but the present disclosure is not limited to these specific embodiments.

FIG. 1 is a schematic flowchart of an object recognition processing method provided in at least one embodiment of the present disclosure.

For example, as shown in FIG. 1, the object recognition processing method provided in an embodiment of the present disclosure includes steps S10 to S13.

As shown in FIG. 1, first, the object recognition processing method includes step S10: acquiring an object to be recognized.

For example, the object to be recognized may include printed or machine-input characters, symbols, and graphics, and may also include handwritten characters, symbols, and graphics. Characters may include Chinese (for example, Chinese characters or Pinyin), English, Japanese, French, Korean, Latin, numbers (for example, date, weight, size, etc.), and symbols may include a ">" symbol, a "<" symbol, a percent sign, etc., and graphics may include circles, rectangles, etc.

For example, in some embodiments, step S10 includes: acquiring an input image, and the input image includes the object to be recognized; processing the input image by means of a region recognition model, so as to obtain a region to be recognized including the object to be recognized; processing the region to be recognized through a character recognition model, so as to obtain the object to be recognized.

For example, in some embodiments, the input image may be an image of a paper quiz, an image of a question set, etc. For example, the paper quiz may be a sample paper quiz (for example, the sample paper quiz may include a paper quiz filled with sample answers or standard answers, etc.) or a student's exam papers, etc. The object to be recognized may be a test question on the paper quiz or the question set, etc., for example, the object to be recognized may be a text question and the like. The paper quiz may be test papers of various subjects, for example, Chinese, mathematics, foreign language (e.g., English, etc.), and similarly, the question set may also be a question set of various subjects. For example, the shape of the input image may be a rectangle or the like. The shape and size of the input image may be set by the user according to the actual situation.

For example, the input image may be an image taken by an image acquisition device (for example, a digital camera or a mobile phone, etc.), and the input image may be a grayscale image or a color image. It should be noted that the input image refers to a form in which an object to be recognized is presented in a visual manner, such as a picture of the object to be recognized. In another example, the input image may also be obtained by means of scanning or the like. For example, the input image may be an image directly acquired by the image acquisition device, or may be an image obtained after preprocessing the acquired image. For example, in order to avoid the influence caused on the object to be recognized by data quality and data imbalance of the image directly acquired by the image acquisition device, before processing the input image, the object recognition processing method may further include preprocessing the image directly acquired by the image acquisition device. The preprocessing may include, for example, performing cropping, gamma correction or noise reduction filtering on the image directly acquired by the image acquisition device. Preprocessing may eliminate irrelevant information or noise information from the input image, so as to facilitate subsequent processing on the input image.

For example, the region recognition model may be implemented by using machine learning technology and executed on a general-purpose computing device or a special-purpose computing device, and the region recognition model is a pre-trained model. The region recognition model may be implemented by using neural networks such as deep convolutional neural network (DEEP-CNN) or deep residual network (ResNet).

For example, the shape of the region to be recognized may be regular or irregular, and the shape of the region to be recognized is determined by the object to be recognized. For example, if the characters, symbols and graphics in the object to be recognized are arranged in a row, then the shape of the region to be recognized may be a rectangle. The present disclosure includes but is not limited to the above situation, it will suffice as long as the region to be recognized can cover the object to be recognized.

For example, the character recognition model may be implemented based on optical character recognition (OCR) and other technologies and executed on a general-purpose computing device or a special-purpose computing device. For example, the character recognition model may also be a pre-trained model, and the character recognition model may be a neural network-based model.

Next, as shown in FIG. 1, in step S11, the type of object to be recognized is recognized based on the type recognition model.

For example, the type recognition model may be implemented based on machine learning technology, and the type recognition model is a pre-trained model. The type recognition model may be implemented by using a neural network such as a convolutional neural network (CNN) and executed, for example, on a general-purpose computing device or a special-purpose computing device.

For example, the types of object to be recognized include basic types and non-basic types. In some embodiments, basic types may include calculation-based questions, knowledge-based questions, etc., and non-basic types include calculation-based fill-in-the-blank questions, calculation-based true-false questions, calculation-based multiple-choice questions, knowledge-based fill-in-the-blank questions, knowledge-based true-false questions, knowledge-based multiple-choice questions, etc. It should be noted that the types of object to be recognized include but are not limited to the above examples, and may also be other suitable types, such as applied questions.

For example, in some embodiments, an example of calculation-based questions reads "The school bought 10 pencil cases and 8 notebooks, and paid 85.6 dollars in total. It is known that each pencil case costs 6 dollars, how much does each notebook cost?" An example of knowledge-based questions reads "What describes the phenomenon of an optical disc spinning in an optical disc drive?"

For example, in calculation-based fill-in-the-blank questions, the question stem contains multiple numbers, and the answer filled in by the user is also a number. In some embodiments, an example of calculation-based fill-in-the-blank questions reads: "Number A is 19.6, which is 1.25 less than number B, and the sum of the two numbers A and B is ( )?" The brackets "( )" should be filled in with the answer calculated by the user, and the answer is a number.

For example, calculation-based multiple-choice questions are multiple-choice questions where the question stem contains multiple numbers and each option is a number. In some embodiments, an example of calculation-based multiple-choice questions reads: "The side length of a square is enlarged by three times, and the area is also enlarged by ( ) times. A.3 B.6 C.9 D.27". The question stem of the calculation-based multiple-choice question is "The side length of the square is enlarged by 3 times, and the area is also enlarged by ( ) times." The respective options for the calculation-based multiple-choice question are "A.3 B. 6 C. 9 D. 27".

For example, calculation-based true-false questions are judgment questions where the question stem includes multiple numbers. In some embodiments, an example of calculation-based true-false questions reads: "The base of an isosceles triangle is 5 cm, the waist is 3 cm, and perimeter of the isosceles triangle is 11 cm. ( )". Brackets "( )" should be filled in with the answer derived by the user, and the answer can be "correct" or "wrong" (or "true" or "false").

For example, knowledge-based fill-in-the-blank questions are a type of fill-in-the-blanks question where there are no or very few numbers in the question stem, and the answers filled in by users are not numbers, and are simply designed for checking acquisition of knowledge. In some embodiments, an example of knowledge-based fill-in-the-blank questions reads: "Is the spinning of the optical disc in the optical disc drive a ( ) phenomenon?" Brackets "( )" should be filled with an answer derived by the user, and the answer is text rather than a number.

For example, knowledge-based multiple-choice questions are a type of multiple-choice question where there are no or very few numbers in the question stem, and there are no numbers in each option, which are simply designed for checking acquisition of knowledge. In some embodiments, an example of knowledge-based multiple-choice questions reads: "The surface on the desk in the classroom is ( ). A. Rectangle B. Square C. Circle". The question stem of the knowledge-based multiple-choice question is "The surface on the desk in the classroom is ( )." Each option for the knowledge-based multiple-choice question is "A. Rectangle B. Square C. Circle".

For example, knowledge-type true-false questions are a type of judgment question where there are no or very few numbers in the question stem, and simply designed for checking acquisition of knowledge. In some embodiments, an example of knowledge-based multiple-choice questions reads: "In an acute triangle, the sum of any two interior angles is greater than a right angle. ( )". Brackets "( )" should be filled in with the answer derived by the user, and the answer can be "correct" or "wrong" (or "true" or "false").

Next, as shown in FIG. 1, in step S12, the processing rule corresponding to the object to be recognized is determined according to the type of the object to be recognized.

For example, different types of object to be recognized correspond to different processing rules.

Finally, as shown in FIG. 1, in step S13, the object to be recognized is recognized and processed by means of the transformer learning model according to the processing rules, so as to obtain the target result corresponding to the object to be recognized.

For example, a transformer learning model is a neural network-based model. Transformer learning models are utilized to transform one text to another. The transformer learning model uses a multi-head self-attention mechanism, which is able to comprehensively utilize information/features of various aspects. Different heads will pay different attention to location information, grammatical information, semantic information, rare words, etc., so that the transformer learning model is able to learn relevant information in different representation subspaces. For example, when a user browses a web page, the user might pay more attention to dark text in terms of color, but pay more attention to large, bold text in terms of font. The color and font here are two different representation subspaces. Paying attention to color and font simultaneously (that is, the multi-head self-attention mechanism) may effectively locate the emphasized content in the web page.

For example, a transformer learning model can process all words or symbols in a sequence in parallel, while using self-attention mechanism to combine context with distant words. By processing all the words in parallel and having each word attend to other words in the sentence in multiple processing steps, the transformer learning model may be trained faster. When the transformer learning model is applied to the field of machine translation, the translation results obtained by the transformer learning model are more accurate.

For example, in some embodiments, step S13 may include: in response to that the type of the object to be recognized is a basic type, the object to be recognized is taken as a target object to be recognized according to the processing rule, and in response to that the type of the object to be recognized is a non-basic type, the object to be recognized is transformed by means of the transformer learning model according to the processing rule, so as to transform the object to be recognized into the target object to be recognized; the target object to be recognized is recognized by means of the transformer learning model, so as to obtain a target result corresponding to the object to be recognized.

For example, the type of the target object to be recognized is a basic type.

For example, in some embodiments, in step S13, the step of performing recognition processing on the target object to be recognized by means of the transformer learning model to obtain a target result corresponding to the object to be recognized includes: performing recognition processing on the target object to be recognized by means of the transformer learning model, so as to obtain a processing result corresponding to the target object to be recognized; processing the processing result according to the processing rule, so as to obtain the target result corresponding to the object to be recognized.

For example, the step of transforming the object to be recognized by means of the transformer learning model so as to transform the object to be recognized into the target object to be recognized includes: in response to that the type of the object to be recognized is the calculation-based fill-in-the-blank questions or knowledge-based fill-in-the-blank questions, transforming the object to be recognized into the target object to be recognized directly by means of the transformer learning model; in response to that the type of the object to be recognized is the calculation-based true-false questions, deleting the judgment result from the object to be recognized by means of the transformer learning model, so as to transform the object to be recognized into a first intermediate object to be recognized, and transforming the first intermediate object to be recognized into the target object to be recognized, and the type of the first intermediate object to be recognized is the calculation-based fill-in-the-blank questions; in response to that the type of the object to be recognized is the calculation-based multiple-choice questions or the knowledge-based multiple-choice questions, deleting respective options from the object to be recognized by means of the transformer learning model, and transforming the question stem in the object to be recognized into the target object to be recognized; in response to that the type of the object to be recognized is the knowledge-based true-false questions, transforming the object to be recognized into a third intermediate object to be recognized by means of the transformer learning model, and the type of the third intermediate object to be recognized is the knowledge-based multiple choice questions; deleting respective options from the third intermediate object to be recognized, transforming the question stem in the third intermediate object to be recognized into a second intermediate object to be recognized, and transforming the second intermediate object to be recognized into the target object to be recognized, and the type of the second intermediate object to be recognized is the knowledge-based fill-in-the-blank questions.

For example, when the type of object to be recognized is calculation-based fill-in-the-blank questions, calculation-based true-false questions or calculation-based multiple-choice questions, the type of target object to be recognized is calculation-based questions. When the type of object to be recognized is knowledge-based fill-in-the-blank questions, knowledge-based true-false questions or knowledge-based multiple-choice questions, the type of target object to be recognized is knowledge-based questions.

For example, the step of processing the processing result according to the processing rule, so as to obtain the target result corresponding to the object to be recognized includes: in response to that the type of the object to be recognized is the calculation-based questions or the knowledge-based questions, outputting the processing result directly as the target result; in response to that the type of the object to be recognized is the calculation-based fill-in-the-blank questions or the knowledge-based fill-in-the-blank questions, taking the part corresponding to the keyword in the processing result as the target result; in response to that the type of the object to be recognized is the calculation-based multiple-choice questions or the knowledge-based multiple-choice questions, selecting the option that is the same as the processing result from the respective options in the object to be recognized and taking the sequence number of the option that is the same as the processing result as the target result; in response to that the type of the object to be recognized is the calculation-based true-false questions, comparing the processing result with the judgment result in the object to be recognized to obtain a comparison result, and taking the comparison result as the target result, and the comparison result includes true, false or to be determined; in response to that the type of the object to be recognized is the knowledge-based true-false questions, selecting the option that is the same as the processing result from the respective options in the third intermediate object to be recognized, and taking the option that is the same as the processing result as the target result.

For example, in some embodiments, step S12 includes: in response to that the type of the object to be recognized is the calculation-based fill-in-the-blank questions or the knowledge-based fill-in-the-blank questions, the processing rule corresponding to the object to be recognized includes adding a keyword for the target object to be recognized; in response to that the type of the object to be recognized is the calculation-based multiple-choice questions or the knowledge-based multiple-choice questions, the processing rule corresponding to the object to be recognized includes selecting the option that is the same as the processing result from the respective options in the object to be recognized; in response to that the type of the object to be recognized is the calculation-based true-false questions, the processing rule corresponding to the object to be recognized includes comparing the processing result with the judgment result in the object to be recognized; in response to that the type of the object to be recognized is the knowledge-based true-false questions, the processing rule corresponding to the object to be recognized includes selecting the option that is the same as the processing result from the respective options in the third intermediate object to be recognized.

For example, when the type of the object to be recognized is the calculation-based fill-in-the-blank questions, the keyword is "fill-in-the-blanks". When the type of the object to be recognized is the knowledge-based fill-in-the-blank questions, the keyword is "fill in text ". For example, in the case of calculation-based fill-in-the-blank questions, since the answers to calculation-based fill-in-the-blank questions do not involve calculation steps and only numbers are required to be filled in (this number is the target result corresponding to the calculation-based fill-in-the-blank questions), the keyword "fill in the blanks" is added in front of the question stem of the calculation-based fill-in-the-blank questions to instruct that the transformer learning model does not need to output calculation steps, but only outputs numbers. In the case of knowledge-based fill-in-the-blank questions, because the answer corresponding to knowledge-based fill-in-the-blank questions does not involve a complete answer, but only requires the output of a keyword (this text is the target result corresponding to the knowledge-based fill-in-the-blank questions), the keyword "fill in text" is added in front of the question stem of the knowledge-based fill-in-the-blank questions to instruct that the transformer learning model does not need to output a complete answer, but only outputs the keyword as the answer.

For example, in the case of calculation-based multiple-choice questions or knowledge-based multiple-choice questions, the calculation-based multiple-choice questions or knowledge-based multiple-choice questions include the question stem and respective options, the target result corresponding to calculation-based multiple-choice questions or knowledge-based multiple-choice questions is the sequence number of one or more options. In the case of calculation-based multiple-choice questions, each option is a number, and in the case of knowledge-based multiple-choice questions, each option is text. It should be noted that in the case of calculation-based multiple-choice questions, in some examples, at least some of the options may also include text and/or symbols, graphics, etc.; similarly, in the case of knowledge-based multiple-choice questions, in some examples, at least some of the options may also include numbers and/or symbols, graphics, and the like.

For example, in the case of calculation-based true-false questions, the calculation-based true-false questions include judgment results, and answering the calculation-based true-false questions is to determine whether the judgment result is correct. Therefore, the target result corresponding to the calculation-based true-false questions can be true, false, or to be determined.

For example, in the case of knowledge-based true-false questions, answering the knowledge-based true-false questions is to determine whether the knowledge described in the test questions is correct. Therefore, the target result corresponding to the calculation-based true-false questions can be correct, false or to be determined.

For example, when the type of object to be recognized is calculation-based questions or knowledge-based questions, the object to be recognized is regarded as the target object to be recognized, and the target object to be recognized is transformed and recognized by means of the transformer learning model, thus obtaining the processing result corresponding to the target object to be recognized, and finally the processing result is directly output as the target result.

For example, a transformer learning model may be pre-trained with a large number of training samples (calculation-based questions, knowledge-based questions, calculation-based fill-in-the-blank questions, knowledge-based fill-in-the-blank questions, calculation-based true-false questions, knowledge-based true-false questions, calculation-based multiple-choice questions, knowledge-based multiple-choice questions and other types of test questions and their corresponding target results).

For example, in an embodiment, a training sample includes knowledge-based questions and their corresponding target results. The knowledge-based question reads: What describes the phenomenon of an optical disc spinning in an optical disc drive? The target result corresponding to the knowledge-based question reads: The rotation of an optical disc in an optical disc drive is a rotational phenomenon. After training the transformer learning model through a large number of similar knowledge-based questions, the transformer learning model is able to learn that the rotation of A in B is a rotational phenomenon. Thus, when the knowledge-based question "What describes the phenomenon of an optical disc spinning in an optical disc drive?" is input into the transformer learning model, the transformer learning model may obtain the processing result: "The rotation of an optical disc in an optical disc drive is a rotational phenomenon", and the processing result is directly output as the target result. That is to say, the transformer learning model may output "the rotation of an optical disc in an optical disc drive is a rotational phenomenon". In another example, when the knowledge-based question "What describes the phenomenon of clock hands spinning on a clock dial" is input into the transformer learning model, the transformer learning model may obtain the processing result: "The spinning of the clock hands on the clock dial is a rotational phenomenon", and the processing result is directly processed output as the target result. That is to say, the transformer learning model may output "the spinning of the clock hands on the clock dial is a rotational phenomenon".

For example, in an embodiment, a training sample includes calculation-based questions and their corresponding target results. The calculation-based question reads: The school bought pencil cases and 8 notebooks, and paid 85.6 dollars in total. It is known that each pencil case costs 6 dollars, how much does each notebook cost? The target result corresponding to the calculation-based questions reads: (85.6−10*6)/8=3.2 dollars\n Answer: Each notebook costs 3.2 dollars. After training the transformer learning model through a large number of similar calculation-based questions, when the calculation-based question "The school bought 10 pencil cases and 8 notebooks, and paid 85.6 dollars in total. It is known that each pencil case costs 6 dollars, how much does each notebook cost?" is input into the transformer learning model, the transformer learning model may get the processing result: "(85.6−10*6)/8=3.2 dollars\n Answer: Each notebook costs 3.2 dollars". The processing result is directly output as the target result, that is to say, the transformer learning model may output "(85.6−10*6)/8=3.2 dollars\n Answer: Each notebook costs 3.2 dollars".

For example, when the type of object to be recognized is calculation-based fill-in-the-blank questions or knowledge-based fill-in-the-blank questions, the transformer learning model may directly transform the object to be recognized into the target object to be recognized, that is, transform the calculation-based fill-in-the-blank questions into calculation-based questions, and transform knowledge-based fill-in-the-blank questions into knowledge-based questions. Then, the transformer learning model performs recognition processing on the target object to be recognized, thereby obtaining the processing result corresponding to the target object to be recognized. Finally the part corresponding to the keyword in the processing result is output as the target result.

For example, in some embodiments, in the calculation-based fill-in-the-blanks question "Number A is 19.6, which is 1.25 less than number B, and the sum of the two numbers A and B is ( )?", first, the calculation-based fill-in-the-blanks question is transformed into the calculation-based question "Number A is 19.6, which is 1.25 less than number B, what is the sum of the two numbers A and B?" Moreover, according to processing rule corresponding to the calculation-based fill-in-the-blank questions, it is necessary to add the keyword "fill in the blank" before the question stem of the calculation-based fill-in-the-blank questions to instruct that there is no need to output calculation steps, thereby transforming the calculation-based fill-in-the-blank questions into the target object to be recognized, and the target object to be recognized reads "Fill in the blank: number A is 19.6, which is 1.25 less than the number B, what is the sum of the two numbers A and B?". Then, the target object to be recognized is input into the transformer learning model, then the transformer learning model may get the processing result "19.6+1.25+19.6=40.45\n Answer: 40.45". Finally, according to the processing rule, the part corresponding to the keyword in the processing result is taken as the target result, namely "40.45" is taken as the target result. Finally, the transformer learning model outputs "40.45". It should be noted that, in calculation-based fill-in-the-blank questions, the part corresponding to the keyword in the processing result may be the number after "Answer:" in the processing result.

For example, in some embodiments, in the knowledge-based fill-in-the-blanks question "Is the spinning of the optical disc in the optical disc drive a ( ) phenomenon?", first, the knowledge-based fill-in-the-blanks question is transformed into knowledge-based question "What describes the phenomenon of an optical disc spinning in the optical disc drive?" In addition, according to the processing rule corresponding to knowledge-based fill-in-the-blank questions, it is necessary to add the keyword "fill in text" before the question stem of the knowledge-based fill-in-the-blank questions to instruct that there is no need to output a complete answer, thereby transforming the knowledge-based fill-in-the-blank questions into the target object to be recognized, and the target object to be recognized reads "Fill in text: What describes the phenomenon of an optical disc spinning in the optical disc drive?"; then, the target object to be recognized is input into the transformer learning model, and the transformer learning model may get the processing result "the rotation of an optical disc in an optical disc drive is a rotational phenomenon." Finally, according to the processing rule, the part corresponding to the keyword in the processing result is taken as the target result, that is, "rotation" is taken as the target result, and finally, the transformer learning model outputs "rotation". It should be noted that, in knowledge-based fill-in-the-blank questions, the part corresponding to the keyword in the processing result may be the text corresponding to the position of "what" in the target object to be recognized in the processing result.

For example, when the type of object to be recognized is calculation-based true-false questions, the transformer learning model may delete the judgment result from the object to be recognized, so as to transform the object to be recognized into the first intermediate object to be recognized, the type of the first intermediate object to be recognized is calculation-based fill-in-the-blank questions. Then, the first intermediate object to be recognized is transformed into the target object to be recognized. Thereafter, the transformer learning model performs recognition processing on the target object to be recognized, thereby obtaining a processing result corresponding to the target object to be recognized. Next, the processing result is compared with the judgment result in the object to be recognized to obtain a comparison result, and finally the comparison result is output as the target result.

For example, in the calculation-based true-false question, the judgment result may be a number.

For example, the comparison result may include true, false, or to be determined. For example, when the processing result and the judgment result are the same, the comparison result is true; when the processing result and the judgment result are not the same, the comparison result is false or to be determined. It should be noted that since the accuracy rate of the output of the transformer learning model is not 100%, if the processing result is different from the deleted judgment result (that is, the number), it cannot be concluded that the calculation-based true-false question is wrong. At this point, the transformer learning model may output false or to be determined, and may output the calculation-based true-false question and the processing result for the user to make judgment. In addition, in some other embodiments, if the processing result is the same as the deleted judgment result, in which case, the transformer learning model may output true, and may output the calculation-based true-false question and the processing result for the user to verify.

For example, in some embodiments, in the calculation-based true-false question, which reads "The base of an isosceles triangle is 5 cm, the waist is 3 cm, and perimeter of the isosceles triangle is 11 cm. ( )", first, the judgment result for the calculation-based true-false question is determined, that is, number "11", then the transformer learning model may delete the judgment result (that is, "11"), and regard the position corresponding to the judgment result as the part that needs to be filled in, thus transforming the calculation-based true-false question into the calculation-based fill-in-the-blanks question (that is, the first intermediate object to be recognized), which reads, "The base of an isosceles triangle is 5 cm, the waist is 3 cm, and perimeter of the isosceles triangle is ( ) cm." Thereafter, the transformed calculation-based fill-in-the-blanks question is transformed into the calculation-based question, which reads "The base of an isosceles triangle is 5 cm, the waist is 3 cm, then what is the perimeter of the isosceles triangle in centimetre?" In addition, according to the processing rule corresponding to the calculation-based fill-in-the-blank questions, it is necessary to add the keyword "fill in the blanks" before the question stem of the calculation-based fill-in-the-blank questions to instruct that there is no need to output calculation steps. Finally, the calculation-based true-false question is transformed into the target object to be recognized, and the target object to be recognized reads "Fill in the blank: The base of an isosceles triangle is 5 cm, the waist is 3 cm, then what is the perimeter of the isosceles triangle in centimetre?" Then, the target object to be recognized is input into the transformer learning model, and the transformer learning model may get the intermediate processing result "5+3+3=11 cm\n Answer: 11". Next, the part corresponding to the keyword in the intermediate processing result (that is, the number after "Answer:" in the intermediate processing result) is taken as the processing result, that is, "11" is taken as the processing result. Finally, according to the processing rule corresponding to the calculation-based true-false questions, the processing result is compared with the judgment result in the object to be recognized to obtain a comparison result, and the comparison result is taken as the target result. In this example, the processing result "11" is the same as the judgment result "11", so the comparison result is "true", and finally the transformer learning model outputs "true".

For example, when the type of object to be recognized is the calculation-based multiple-choice questions, the transformer learning model deletes respective options from the object to be recognized, and transforms the question stem in the object to be recognized to the target object to be recognized. Then, the transformer learning model performs recognition processing on the target object to be recognized, so as to obtain the processing result corresponding to the target object to be recognized, and then selects the option that is the same as the processing result from respective options in the object to be recognized, and finally outputs the sequence number of the option that is the same as the processing result as the target result.

For example, the sequence number of respective options may include A, B, C, D or 1, 2, 3, 4 and so on. The number of options may be determined according to the actual situation, for example, 3 or 4 and so on.

For example, in some embodiments, in the calculation-based multiple-choice question, which reads "The side length of a square is enlarged by three times, and the area is also enlarged by ( ) times. A.3 B.6 C.9 D.27", in which the question stem is "the side length of a square is enlarged by three times, and the area is also enlarged by ( ) times", and the respective options are "A.3 B.6 C.9 D.27". The question stem of the calculation-based multiple-choice question is a calculation-based fill-in-the-blanks question. First, the respective options for the calculation-based multiple-choice question are determined, namely "A.3 B. 6 C.9 D.27". Then, the transformer learning model may delete the respective options, and then transform the question stem (that is, calculation-based fill-in-the-blanks question) in the calculation-based multiple-choice question into the calculation-based question "The side length of a square is enlarged by 3 times, and how many times is the area is enlarged?" In addition, according to the processing rule corresponding to the calculation-based fill-in-the-blanks question, it is necessary to add the keyword "fill in the blank" before the question stem of the calculation-based fill-in-the-blanks question, and finally, the calculation-based true-false question is transformed into the target object to be recognized, and the target object to be recognized reads "Fill in the blank: The side length of the square is enlarged by 3 times, and how many times is the area enlarged?". Thereafter, the target object to be recognized is input into the transformer learning model, and the transformer learning model may obtain the intermediate processing result "3*3=9\n Answer: 9". Next, the part corresponding to the keyword in the intermediate processing result (that is, the number after "Answer:" in the intermediate processing result) is taken as the processing result, that is, "9" is taken as the processing result. Finally, according to the processing rule corresponding to the calculation-based multiple-choice question, the option that is the same as the processing result is selected from the respective options in the object to be recognized. In this example, the processing result "9" is the same as the option "9", so the sequence number "C" corresponding to the option "9" is taken as the target result, and finally the transformer learning model outputs "C".

For example, when the type of the object to be recognized is knowledge-based multiple-choice questions, the transformer learning model deletes options from the object to be recognized, and transforms the question stem in the object to be recognized into the target object to be recognized. Then, the transformer learning model performs recognition processing on the target object to be recognized, so as to obtain the processing result corresponding to the target object to be recognized, then selects the option that is the same as the processing result from the respective options in the object to be recognized, and finally outputs the sequence number of the option that is the same as the processing result as the target result.

For example, the sequence number of the respective options may include A, B, C, D or 1, 2, 3, 4 and so on. The number of options may be determined according to the actual situation, for example, 3 or 4 and so on.

For example, in some embodiments, in the knowledge-based multiple-choice question, which reads "The surface on the desk in the classroom is ( ) A. Rectangle B. Square C. Circle", in which the question stem is "The surface on the desk in the classroom is ( ), and the respective options are "A. rectangle B. square C. circle". The question stem of the knowledge-based multiple-choice question is a knowledge-based fill-in-the-blanks question. First, the respective options in the knowledge-based multiple-choice question are determined, that is, "A. Rectangle B. Square C. Circle", the transformer learning model may delete the respective options and transform the question stem (that is, knowledge-based fill-in-the-blanks question) in the knowledge-based multiple-choice question into the knowledge-based question "what is the shape of the surface on the desk in the classroom". In addition, according to the processing rule corresponding to the knowledge-based fill-in-the-blank questions, it is necessary to add the keyword "fill in text" before the question stem of the knowledge-based fill-in-the-blank questions to instruct that there is no need to output a complete answer. Since the knowledge-based question obtained after transformation might be relatively broad in scope, there might be multiple answers to the knowledge-based question obtained after transformation (for example, in the knowledge-based multiple-choice question, the part in the brackets in the question stem may be filled with rectangles, flat, plane, etc.). Accordingly, the options for knowledge-based multiple-choice question may be add as supplement after the transformed knowledge-based question to limit the output of the transformer learning model. Finally, the knowledge-based multiple-choice question is transformed into the target object to be recognized, and the target object to be recognized reads "Fill in text: What is the shape of the surface on the desk in the classroom?\n Select\n Rectangle\n Square\n Circle". Then, the target object to be recognized is input into the transformer learning model, and the transformer learning model may obtain the processing result "Answer: Rectangle". Finally, according to the processing rule corresponding to the knowledge-based multiple-choice questions, the option that is the same as the processing result is selected from the respective options in the object to be recognized. In this example, the processing result "rectangle" is the same as the option "rectangle", so the sequence number "A" corresponding to the option "rectangle" is taken as the target result, and finally the transformer learning model outputs "A".

For example, when the type of the object to be recognized is a knowledge-based true-false question, the transformer learning model transforms the object to be recognized into the third intermediate object to be recognized, and then deletes the respective options from the third intermediate object to be recognized, and transforms the question stem in the third intermediate object to be recognized into the second intermediate object to be recognized, and finally, transforms the second intermediate object to be recognized into the target object to be recognized. For example, the type of the third intermediate object to be recognized is the knowledge-based multiple-choice question, and the type of the second intermediate object to be recognized is the knowledge-based fill-in-the-blanks question. Then, the transformer learning model performs recognition processing on the target object to be recognized, so as to obtain the processing result corresponding to the target object to be recognized, and then selects the option that is the same as the processing result from the respective options in the third intermediate object to be recognized, and finally, outputs the option that is the same as the processing result as the target result.

For example, since the knowledge-based true-false questions actually involve selection of true or false, the respective options in the third intermediate object to be recognized may include right and wrong (or, true and false).

For example, in some embodiments, in the knowledge-based true-false question, which reads "In an acute triangle, the sum of any two interior angles is greater than a right angle. ( ), in which the question stem is "In an acute triangle, the sum of any two interior angles is greater than a right angle." First, the question stems in the knowledge-based true-false question is transformed into the knowledge-based multiple-choice question (that is, the third intermediate object to be recognized), which reads "In an acute triangle, the sum of any two interior angles is greater than a right angle, and the statement is ( ) A. True B. False", in which the question stem of the transformed knowledge-based multiple-choice question reads "In an acute triangle, the sum of any two interior angles is greater than a right angle is ( ), which is a knowledge-based fill-in-the-blanks question, and the options are "A. True B. False". Then, the transformer learning model may delete the options from the transformed knowledge-based multiple-choice question, and transform the question stem in the transformed knowledge-based multiple-choice question into a knowledge-based question, which reads "In an acute triangle, which of the following best describes the statement: the sum of any two interior angles is greater than a right angle?" In addition, according to the processing rule corresponding to knowledge-based fill-in-the-blank questions, it is necessary to add the keyword "fill in text" before the question stem of knowledge-based fill-in-the-blank questions to instruct that there is no need to output a complete answer. Since the knowledge-based questions after transformation might be relatively broad in scope, there might be multiple answers to the transformed knowledge-based questions. Therefore, the options for knowledge-based multiple-choice question after transformation may be add as supplement after the transformed knowledge-based question to limit the output of the transformer learning model. Finally, the knowledge-based true-false question is transformed into the target object to be recognized, and the target object to be recognized reads "Fill in text: In an acute triangle, which of the following best describes the statement: the sum of any two interior angles is greater than the right angle? \n Select\n True\n False". Next, the target object to be recognized is input into the transformer learning model, then the transformer learning model may obtain the processing result "answer: true". Finally, according to the processing rule corresponding to the knowledge-based true-false questions, the option that is the same as the processing result is selected from the options in the object to be recognized. In this example, the processing result "True" is the same as the option "True", so the option "True" is taken the target result, and finally the transformer learning model outputs "True".

It should be noted that the specific embodiments described above are all illustrative, and are not intended to limit the embodiments of the present disclosure.

It should be noted that in the embodiments of the present disclosure, the respective models (for example, a transformer learning model, a region recognition model, a character recognition model, a type recognition model, etc.) are not just a mathematical model, but they are modules able to receive input data, perform data processing, and output processing results. The modules can be a software module, a hardware module (such as a hardware neural network), or a combination of software and hardware. In some embodiments, the respective models include codes and programs stored in memory. The codes and programs may be executed by the processor to implement some or all of the functions of the respective models as described above. In still other embodiments, the respective models may include a circuit board or a combination of multiple circuit boards for realizing the functions described above. In some embodiments, the circuit board or combination of multiple circuit boards may include: (1) one or more processors; (2) one or more non-transitory computer-readable memory connected to the processor; and (3) processor-executable firmware stored in memory.

It should be understood that, in the embodiment of the present disclosure, before acquiring the object to be recognized, the object recognition processing method further includes: a training phase. The training phase includes the process of training the transformer learning model, type recognition model, region recognition model and character recognition model, etc. Regarding the training phase, reference may be made to the conventional training process in the art, and details will not be repeated here.

Figure 2:
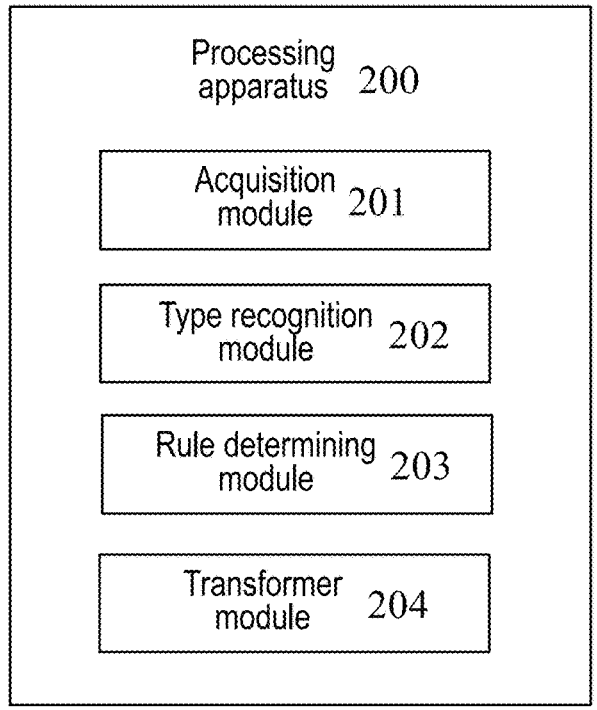
FIG. 2 is a schematic block diagram of a processing apparatus provided in at least one embodiment of the present disclosure.

Corresponding to the above object recognition processing method, at least one embodiment of the present disclosure further provides a processing apparatus, and FIG. 2 is a schematic block diagram of a processing apparatus provided in at least one embodiment of the present disclosure.

For example, as shown in FIG. 2, the processing apparatus 200 includes an acquisition module 201, a type recognition module 202, a rule determining module 203 and a transformer module 204.

For example, the acquisition module 201 is configured to obtain an object to be recognized.

The type recognition module 202 is configured to recognize the type of object to be recognized based on the type recognition model.

The rule determining module 203 is configured to determine a processing rule corresponding to the object to be recognized according to the type of the object to be recognized.

The transformer module 204 is configured to recognize and process the object to be recognized by means of the transformer learning model according to the processing rules, so as to obtain the target result corresponding to the object to be recognized.

For example, when the transformer module 204 performs the operation of recognizing and processing the object to be recognized by means of the transformer learning model according to the processing rules, so as to obtain the target result corresponding to the object to be recognized, the operation includes performing the following steps: in response to that the type of the object to be recognized is a basic type, taking, according to the processing rule, the object to be recognized as a target object to be recognized, and in response to that the type of the object to be recognized is a non-basic type, transforming the object to be recognized by means of the transformer learning model according to the processing rule, so as to transform the object to be recognized into the target object to be recognized; and performing recognition processing on the target object to be recognized by means of the transformer learning model, so as to obtain a target result corresponding to the object to be recognized, and the type of the target object to be recognized is a basic type.

For example, the acquisition module 201, the type recognition module 202, the rule determining module 203 and/or the transformer module 204 include codes and programs stored in memory. The processor may execute the codes and programs to realize some or all of the functions of the acquisition module 201, the type recognition module 202, the rule determining module 203 and/or the transformer module 204. For example, the acquisition module 201, the type recognition module 202, the rule determining module 203 and/or the transformer module 204 may be specific-purpose hardware devices, which are provided to implement some or all of the functions of the acquisition module 201, the type recognition module 202, the rule determining module 203 and/or the transformer module 204. For example, the acquisition module 201, the type recognition module 202, the rule determining module 203 and/or the transformer module 204 may be a circuit board or a combination of multiple circuit boards for realizing the functions described above. In an embodiment of the present disclosure, the circuit board or a combination of multiple circuit boards may include: (1) one or more processors; (2) one or more non-transitory memories connected to the processor; and (3) processor-executable firmware stored in memory.

It should be noted that the acquisition module 201 is configured to realize step S10 shown in FIG. 1, the type recognition module 202 is configured to realize step S11 shown in FIG. 1, the rule determining module 203 is configured to realize step S12 shown in FIG. 1, and the transformer module 204 is configured to realize step S13 shown in FIG. 1. Therefore, for the specific description of the acquisition module 201, reference may be made to the relevant description of step S10 shown in FIG. 1 in the embodiments of the object recognition processing method. For the specific description of the type recognition module 202, reference may be made to the relevant description of step S11 shown in FIG. 1 in the embodiments of the object recognition processing method. For the specific description of the rule determining module 203, reference may be made to the relevant description of step S12 shown in FIG. 1 in the embodiments of the object recognition processing method. For the specific description of the transformer module 204, reference may be made to the relevant description of step S13 shown in FIG. 1 in the embodiments of the object recognition processing method. In addition, the processing apparatus may achieve technical effects similar to those of the object recognition processing method, and the details will not be repeated here.

Figure 3:
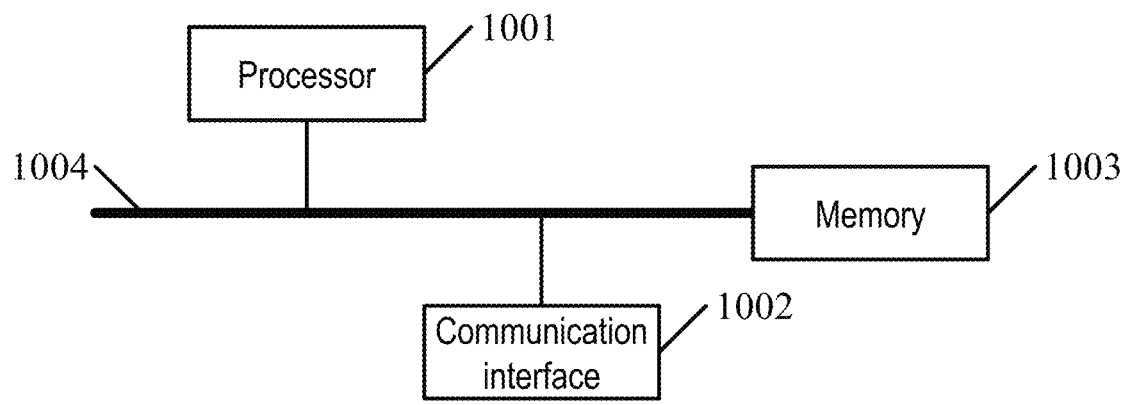
FIG. 3 is a schematic block diagram of an electronic device provided in at least one embodiment of the present disclosure.

At least one embodiment of the present disclosure further provides an electronic device, and FIG. 3 is a schematic block diagram of an electronic device provided in at least one embodiment of the present disclosure.

For example, as shown in FIG. 3, the electronic device includes a processor 1001, a communication interface 1002, a memory 1003 and a communication bus 1004. The processor 1001, the communication interface 1002, and the memory 1003 communicate with each other through the communication bus 1004, and the processor 1001, the communication interface 1002, the memory 1003 and other components may also communicate with one another through a network connection. The present disclosure does not limit the type and function of the network here.

For example, the memory 1003 is configured to store computer-readable instructions on a non-transitory basis. When the processor 1001 is configured to execute computer-readable instructions, the computer-readable instructions are executed by the processor 1001 to implement the object recognition processing method described in any one of the foregoing embodiments. For the specific implementation of various steps of the object recognition processing method and related explanations, reference may be made to the above-mentioned embodiment of the object recognition processing method, and details are not repeated here.

For example, the implementation of the object recognition processing method by the processor 1001 executing the program stored in the memory 1003 is the same as the implementation mentioned in the above-mentioned embodiments of the object recognition processing method, and details are not repeated here.

For example, the communication bus 1004 may be a peripheral component interconnect standard (PCI) bus, an extended industry standard architecture (EISA) bus, or the like. The communication bus may be divided into an address bus, a data bus, a control bus, and the like. For ease of illustration, only one thick line is used to denote the bus in the figure, but it does not mean that there is only one bus or one type of bus.

For example, the communication interface 1002 is configured to implement communication between the electronic device and other devices.

For example, the processor 1001 and the memory 1003 may be set at the server (or cloud).

For example, the processor 1001 may control other components in the electronic device to perform desired functions. The processor 1001 may be a central processing unit (CPU), a network processor (NP), etc., and may also be a digital signal processor (DSP), an application specific integrated circuit (ASIC), a field programmable gate array (FPGA) or other programmable logic devices, discrete gate or transistor logic devices, discrete hardware components. The central processing unit (CPU) may be of X86 or ARM architecture, etc.

For example, the memory 1003 may include any combination of one or more computer program products, which may include various forms of computer-readable storage media, such as volatile memory and/or non-volatile memory. The volatile memory may include, for example, random access memory (RAM) and/or cache memory. Non-volatile memory may include, for example, read only memory (ROM), hard disks, erasable programmable read only memory (EPROM), compact disc read only memory (CD-ROM), USB memory, flash memory, and the like. One or more computer-readable instructions may be stored in the computer-readable storage medium, and the processor 1001 may execute the computer-readable instructions to realize various functions of the electronic device. Various application programs, various data, and the like may also be stored in the storage medium.

For example, for a detailed description of the process of performing object recognition processing by an electronic device, reference may be made to the relevant descriptions in the embodiments of the object recognition processing method, and the same descriptions will not be incorporated here.

Figure 4:
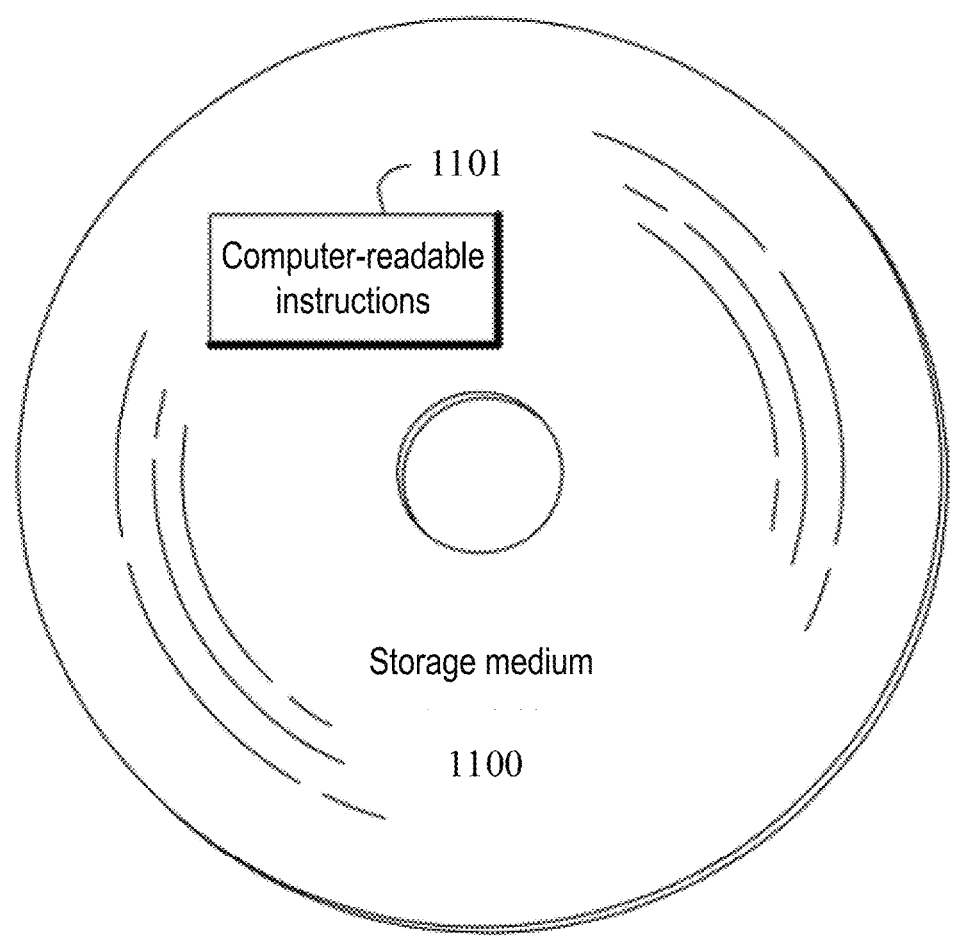
FIG. 4 is a schematic diagram of a non-transitory computer-readable storage medium provided in at least one embodiment of the present disclosure.

FIG. 4 is a schematic diagram of a non-transitory computer-readable storage medium provided in at least one embodiment of the present disclosure. For example, as shown in FIG. 4, one or more computer-readable instructions 1101 may be stored in a non-transitory manner in a storage medium 1100. For example, when the computer-readable instructions 1101 are executed by the processor, one or more steps in the object recognition processing method described above may be performed.

For example, the storage medium 1100 may be applied to the above-mentioned electronic device and/or the processing apparatus 200. For example, the storage medium 1100 may include the memory 1003 in an electronic device.

For example, for the description of the storage medium 1100, reference may be made to the description of the memory in the embodiments of the electronic device, and the same descriptions will not be incorporated herein.

Figure 5:
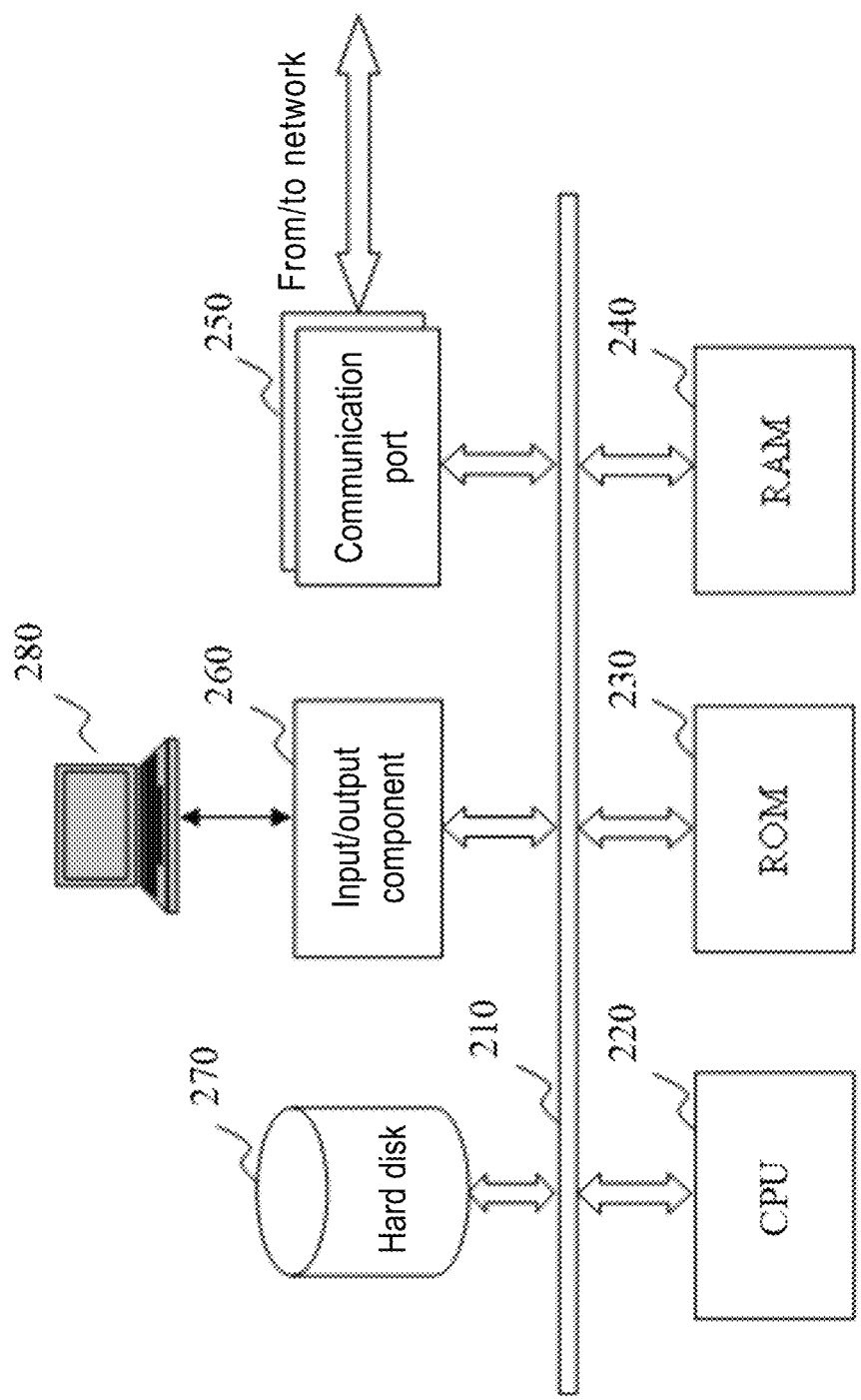
FIG. 5 is a schematic diagram of a hardware environment provided in at least one embodiment of the present disclosure.

FIG. 5 is a schematic diagram of a hardware environment provided in at least one embodiment of the present disclosure. The electronic device provided in the present disclosure may be applied to the Internet system.

The functions of the image processing apparatus and/or electronic equipment involved in the present disclosure may be realized by using the computer system provided in FIG. 5. Such computer systems may include personal computers, laptops, tablets, mobile phones, personal digital assistants, smart glasses, smart watches, smart rings, smart helmets, and any smart portable or wearable device. The specific system in this embodiment illustrates a hardware platform including a user interface using functional block diagrams. Such computer equipment may be a general-purpose computer equipment or a special-purpose computer equipment. Both computer equipment may be used to realize the image processing apparatus and/or electronic device in this embodiment. The computer system may include any components that implement the information needed to achieve presently described image processing. For example, a computer system may be realized by a computer equipment through its hardware devices, software programs, firmware, and combinations thereof. For the purpose of convenience, only one computer equipment is drawn in FIG. 5, but the computer functions related to the information needed to realize the image processing described in this embodiment may be implemented by a group of similar platforms in a distributed manner, so as to separate the processing load on a computer system.

As shown in FIG. 5, the computer system may include a communication port 250, which is connected to a network for data communication. For example, the computer system may send and receive information and data through the communication port 250, that is, the communication port 250 may realize the wireless or wired communication between the computer system and other electronic devices to exchange data. The computer system may further include a processor assembly 220 (i.e., the processor described above) for executing program instructions. The processor assembly 220 may be composed of at least one processor (e.g., CPU). The computer system may include an internal communication bus 210. The computer system may include different forms of program storage units and data storage units (that is, the memory or storage medium described above), such as a hard disk 270, a read-only memory (ROM) 230, a random access memory (RAM) 240, which may be used to store various data and files used by the computer for processing and/or communicating, as well as program instructions possibly executed by the processor assembly 220. The computer system may further include an input/output component 260 for enabling input/output data flow between the computer system and other components (e.g., user interface 280, etc.).

Typically, the following devices may be connected to the input/output assembly 260: including input devices such as a touch screen, a touchpad, a keyboard, a mouse, a camera, a microphone, an accelerometer, a gyroscope, etc.; including output devices such as a liquid crystal display (LCD), a speaker, a vibrator, etc.; including storage devices such as magnetic tapes, hard disks, etc.; and communication interfaces.

While FIG. 5 shows a computer system with various devices, it should be understood that the computer system is not required to have all of the devices shown and, alternatively, the computer system may have more or fewer devices.

In this disclosure, explanations for the following aspects should be provided below:

(1) The drawings of the embodiments of the present disclosure only relate to the structures involved in the embodiments of the present disclosure. For other structures, reference may be made to general designs.

(2) For clarity, in the drawings that describe the embodiments of the present disclosure, the thickness and size of layers or structures are exaggerated. It should be understood that when an element such as a layer, film, region, or substrate is referred to as being "on" or "under" another element, it can be "directly on" or "under" the other element, or an intervening element may be present therebetween.

(3) The embodiments of the present disclosure and the features in the embodiments may be combined with each other to obtain new embodiments as long as there is no conflict between them.

The above description is only a specific implementation of the present disclosure, but the scope to be protected by the present disclosure is not limited thereto, and the scope to be protected by the present disclosure should be based on the scope to be protected by the claims.

What is claimed is:

1. An object recognition processing method, comprising:
obtaining an object to be recognized;
recognizing a type of the object to be recognized based on a type recognition model;
determining, according to the type of the object to be recognized, a processing rule corresponding to the object to be recognized;
performing, according to the processing rule, a recognition processing on the object to be recognized by means of a transformer learning model, so as to obtain a target result corresponding to the object to be recognized,
wherein the step of performing, according to the processing rule, the recognition processing on the object to be recognized by means of the transformer learning model, so as to obtain the target result corresponding to the object to be recognized comprises:
in response to that the type of the object to be recognized is a basic type, taking, according to the processing rule, the object to be recognized as a target object to be recognized, and in response to that the type of the object to be recognized is a non-basic type, transforming the object to be recognized by means of the transformer learning model according to the processing rule, so as to transform the object to be recognized into the target object to be recognized;
performing the recognition processing on the target object to be recognized by means of the transformer learning model, so as to obtain the target result corresponding to the object to be recognized,
wherein a type of the target object to be recognized is the basic type;
wherein the step of transforming the object to be recognized by means of the transformer learning model, so as to transform the object to be recognized into the target object to be recognized comprises:
in response to that the type of the object to be recognized is calculation-based fill-in-the-blank questions or knowledge-based fill-in-the-blank questions, transforming the object to be recognized into the target object to be recognized directly by means of the transformer learning model;
in response to that the type of the object to be recognized is calculation-based true-false questions, deleting a judgment result from the object to be recognized by means of the transformer learning model, so as to transform the object to be recognized into a first intermediate object to be recognized, and transforming the first intermediate object to be recognized into the target object to be recognized, wherein a type of the first intermediate object to be recognized is the calculation-based fill-in-the-blank questions;
in response to that the type of the object to be recognized is calculation-based multiple-choice questions or knowledge-based multiple-choice questions, deleting respective options from the object to be recognized by means of the transformer learning model, and transforming a question stem in the object to be recognized into the target object to be recognized;
in response to that the type of the object to be recognized is knowledge-based true-false questions, transforming the object to be recognized into a third intermediate object to be recognized by means of the transformer learning model, wherein a type of the third intermediate object to be recognized is the knowledge-based multiple-choice questions, deleting respective options from the third intermediate object to be recognized, transforming a question stem in the third intermediate object to be recognized into a second intermediate object to be recognized, and transforming the second intermediate object to be recognized into the target object to be recognized, wherein a type of the second intermediate object to be recognized is the knowledge-based fill-in-the-blank questions.

2. The object recognition processing method according to claim 1, wherein the step of performing the recognition processing on the target object to be recognized by means of the transformer learning model, so as to obtain the target result corresponding to the object to be recognized further comprises:
performing the recognition processing on the target object to be recognized by means of the transformer learning model, so as to obtain a processing result corresponding to the target object to be recognized;
processing the processing result according to the processing rule, so as to obtain the target result corresponding to the object to be recognized.

3. The object recognition processing method according to claim 2, wherein the basic type comprises calculation-based questions or knowledge-based questions,
the non-basic type comprises the calculation-based fill-in-the-blank questions, the calculation-based true-false questions, the calculation-based multiple-choice questions, the knowledge-based fill-in-the-blank questions, the knowledge-based true-false questions, or the knowledge-based multiple-choice questions.

4. The object recognition processing method according to claim 1, wherein the step of determining, according to the type of the object to be recognized, the processing rule corresponding to the object to be recognized comprises:
in response to that the type of the object to be recognized is the calculation-based fill-in-the-blank questions or the knowledge-based fill-in-the-blank questions, the processing rule corresponding to the object to be recognized comprises adding a keyword for the target object to be recognized;
in response to that the type of the object to be recognized is the calculation-based multiple-choice questions or the knowledge-based multiple-choice questions, the processing rule corresponding to the object to be recognized comprises selecting an option that is the same as the processing result from the respective options in the object to be recognized;
in response to that the type of the object to be recognized is the calculation-based true-false questions, the processing rule corresponding to the object to be recognized comprises comparing the processing result with the judgment result in the object to be recognized;
in response to that the type of the object to be recognized is the knowledge-based true-false questions, the processing rule corresponding to the object to be recognized comprises selecting an option that is the same as the processing result from the respective options in the third intermediate object to be recognized.

5. The object recognition processing method according to claim 4, wherein the step of processing the processing result according to the processing rule, so as to obtain the target result corresponding to the object to be recognized comprises:

in response to that the type of the object to be recognized is the calculation-based questions or the knowledge-based questions, outputting the processing result directly as the target result;

in response to that the type of the object to be recognized is the calculation-based fill-in-the-blank questions or the knowledge-based fill-in-the-blank questions, taking a part corresponding to the keyword in the processing result as the target result;

in response to that the type of the object to be recognized is the calculation-based multiple-choice questions or the knowledge-based multiple-choice questions, selecting an option that is the same as the processing result from the respective options in the object to be recognized and taking a sequence number of the option that is the same as the processing result as the target result;

in response to that the type of the object to be recognized is the calculation-based true-false questions, comparing the processing result with the judgment result in the object to be recognized to obtain a comparison result, and taking the comparison result as the target result, wherein the comparison result comprises true, false or to be determined;

in response to that the type of the object to be recognized is the knowledge-based true-false questions, selecting an option that is the same as the processing result from the respective options in the third intermediate object to be recognized, and taking the option that is the same as the processing result as the target result.

6. The object recognition processing method according to claim 4, wherein when the type of the object to be recognized is the calculation-based fill-in-the-blank questions, the keyword is "fill-in-the-blanks", when the type of the object to be recognized is the knowledge-based fill-in-the-blank questions, the keyword is "fill in text".

7. The object recognition processing method according to claim 1, wherein the step of obtaining the object to be recognized comprises:

obtaining an input image, wherein the input image comprises the object to be recognized;

processing the input image by means of a region recognition model, so as to obtain a region to be recognized comprising the object to be recognized;

processing the region to be recognized through a character recognition model, so as to obtain the object to be recognized.

8. The object recognition processing method according to claim 7, wherein the input image is an image of a paper quiz, and the object to be recognized is a test question on the paper quiz.

9. The object recognition processing method according to claim 1, wherein the transformer learning model is a model based on a neural network.

10. An electronic device, comprising:

a memory configured to store computer-readable instructions in a non-transitory manner;

a processor configured to execute the computer-readable instructions, wherein when the computer-readable instructions are executed by the processor, the object recognition processing method according to claim 1 is implemented.

11. A non-transitory computer-readable storage medium, wherein the non-transitory computer-readable storage medium stores computer-readable instructions, when the computer-readable instructions are executed by a processor, the object recognition processing method according to claim 1 is implemented.

12. A processing apparatus, comprising:

a memory, storing instructions; and a processor, configured to load the instructions stored in the memory, and execute the instruction, wherein, when the instructions are executed, the processor is configured to function as:

an acquisition module, configured to acquire an object to be recognized;

a type recognition module, configured to recognize a type of the object to be recognized based on a type recognition model;

a rule determining module, configured to determine a processing rule corresponding to the object to be recognized according to the type of the object to be recognized; and a transformer module, configured to recognize the object to be recognized through a transformer learning model according to the processing rule, so as to obtain a target result corresponding to the object to be recognized, wherein when the transformer module executes an operation of recognizing the object to be recognized by the transformer learning model according to the processing rule to obtain the target result corresponding to the object to be recognized, the operation of recognizing comprises the following steps:

in response to that the type of the object to be recognized is a basic type, taking the object to be recognized as a target object to be recognized according to the processing rule, in response to that the type of the object to be recognized is a non-basic type, transforming the object to be recognized by the transformer learning model according to the processing rule, so as to transform the object to be recognized into the target object to be recognized;

recognizing the target object to be recognized by the transformer learning model, so as to obtain the target result corresponding to the object to be recognized, wherein a type of the target object to be recognized is the basic type;

wherein the step of transforming the object to be recognized by the transformer learning model, so as to transform the object to be recognized into the target object to be recognized, comprises:

in response to that the type of the object to be recognized is calculation-based fill-in-the-blank questions or knowledge-based fill-in-the-blank questions, transforming the object to be recognized into the target object to be recognized directly by the transformer learning model;

in response to that the type of the object to be recognized is calculation-based true-false questions, deleting a judgment result from the object to be recognized by the transformer learning model, so as to transform the object to be recognized into a first intermediate object to be recognized, and transforming the first intermediate object to be recognized into the target object to be recognized, wherein a type of the first intermediate object to be recognized is the calculation-based fill-in-the-blank questions;

in response to that the type of the object to be recognized is calculation-based multiple-choice questions or knowledge-based multiple-choice questions, deleting respective options from the object to be recognized by the transformer learning model, and transforming a question stem in the object to be recognized into the target object to be recognized;

in response to that the type of the object to be recognized is knowledge-based true-false questions, transforming the object to be recognized into a third intermediate object to be recognized by the transformer learning model, wherein a type of the third intermediate object to be recognized is the knowledge-based multiple-choice questions, deleting respective options from the third intermediate object to be recognized, transforming a question stem in the third intermediate object to be recognized into a second intermediate object to be recognized, and transforming the second intermediate object to be recognized into the target object to be recognized, wherein a type of the second intermediate object to be recognized is the knowledge-based fill-in-the-blank questions.

13. The processing apparatus according to claim 12, wherein when the transformer module executes the operation of recognizing the object to be recognized by means of the transformer learning model according to the processing rule to obtain the target result corresponding to the object to be recognized, the operation of recognizing comprises the following steps:

performing a recognition processing on the target object to be recognized by means of the transformer learning model, so as to obtain a processing result corresponding to the target object to be recognized;

processing the processing result according to the processing rule, so as to obtain the target result corresponding to the object to be recognized.

* * * * *